April 19, 1966  B. RAPSON  3,246,522
METHOD FOR MEASURING PRESSURE OF GASES
Filed Sept. 13, 1963
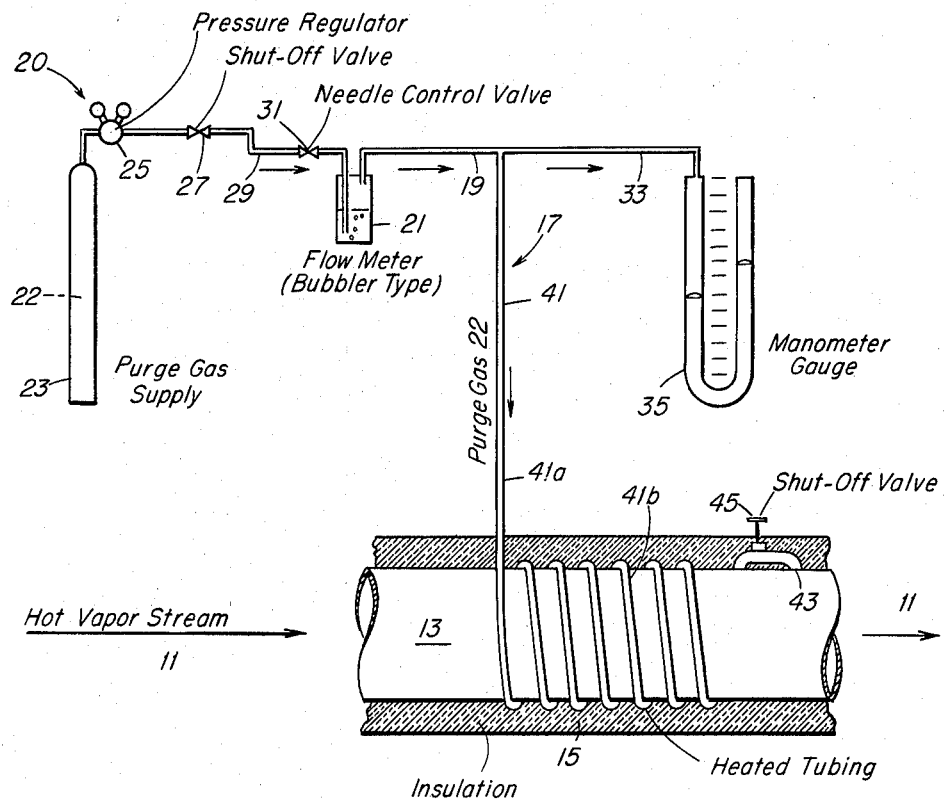
INVENTOR.
Bryan Rapson
BY Robert S. Dunham
Attorney

United States Patent Office 3,246,522
Patented Apr. 19, 1966

3,246,522
METHOD FOR MEASURING PRESSURE OF GASES
Bryan Rapson, Arvida, Quebec, Canada, assignor to Aluminium Laboratories Limited, Montreal, Quebec, Canada, a corporation of Canada
Filed Sept. 13, 1963, Ser. No. 308,703
3 Claims. (Cl. 73—389)

This invention relates to a method for measuring the pressure of gases or vapors.

Industrial operations frequently require that gas or vapor pressure measurements be made of gaseous fluids which are corrosive in character thereby requiring expensive gauges; and/or are at a temperature such that ordinary pressure gauges cannot give accurate readings or introduce complications which render measuring at these conditions undesirable; and/or are noxious so that atmospheric contamination must be avoided.

In one process it is necessary to accurately measure the pressure of hot aluminum trichloride vapors. This measurement is complicated by the high sublimation temperature of aluminum trichloride (181° C. at a pressure of one atmosphere). Thus, a pressure gauge to function properly in direct contact with aluminum trichloride vapors at one atmosphere must be maintained at a temperature of at least 181° C., otherwise condensation of solid aluminum trichloride will occur. Unfortunately, there are no pressure gauges commercially made to operate at these conditions.

One known method for measuring the pressure of high temperature gases consists of transmitting the hot gas pressure through a heated diaphragm to a second fluid which in turn transmits the pressure to a remotely-located pressure gauge maintained at room temperature. The temperature gradient occurs in the tubing connecting the pressure gauge to the diaphragm. Experience with diaphragm-type pressure gauges, however, has not been good. Both the accuracy and reliability of diaphragm-type gauges deteriorate with time; thus, this type of gauge is not satisfactory for a process having critical requirements of maintained accuracy.

Alternative methods of measuring the pressure of gaseous aluminum trichloride have been considered and some tried. A heated manometer containing mercury or other dense liquid has been suggested. The use of mercury at high temperatures is undesirable because of the health hazard resulting from the presence of mercury vapor. Fluids of the organic type, such as dibutyl phthalate and silicone oils, undergo physical or chemical changes in the presence of gaseous aluminum trichloride rendering them unsuitable for such application.

An object of the invention is a method for determining the pressure of a gas stream whose characteristics, such as, temperature and/or corrosiveness, render direct pressure measurement undesirable. A further object is a method of measuring the pressure of hot vapors afforded by a normally solid material, such as aluminum trichloride.

Further objects of the apparatus and method inventions will become apparent in the course of the detailed description of the invention.

The single figure shows an embodiment of the invention suitable for measuring the pressure of hot aluminum trichloride vapors.

It has been discovered that the pressure of a gaseous fluid whose characteristics render direct pressure measurement undesirable can be simply, safely and accurately measured by means of an apparatus comprising, in combination, a pressure gauge; conduit means adopted for communication with said gauge and for direct communication with a body of gas whose pressure is to be measured; and gas delivery means for passing another gas into said conduit means at a controlled rate affording a substantially balanced state with respect to gas whose pressure is to be measured. When needed, heating means are present for heating a portion of the conduit means adjacent said body of gas to prevent condensation of gas in said conduit means.

The pressure of a gaseous stream whose characteristics render direct pressure determination undesirable can be determined by placing a first gas stream in direct communication with the gas stream whose pressure is to be determined, in a substantially balanced flow condition, and measuring the pressure exerted by the first gas to determine the pressure of the other gas stream. Ordinarily the first gas is held at a moderate temperature well below the temperature of the other gas.

The apparatus and method inventions are described in connection with the figure which forms a part of this specification. However, it is to be understood the figure sets forth but one embodiment of the invention and the scope of the invention is not limited thereto.

In the figure, a hot aluminum trichloride vapor stream 11 whose pressure is to be determined is passing through a pipe 13, only partially shown. Pipe 13 is provided with thermal insulation 15.

Conduit means 17 is in this instance a long length of metal tubing permitting remote measuring of the vapor pressure within pipe 13. Conduit means 17 here is formed of a length of tubing 19 communicating with flowmeter 21, as part of gas delivery means 20, to receive a second gas 22 (said vapor 11 is the first gaseous fluid) which enters flowmeter 21 from supply 23 by way of pressure regulator 25, shut-off valve 27, and tubing 29 which contains needle control valve 31. (Hereinafter the second gas from supply 23 is referred to as purge gas 22.)

Tubing 19 communicates with tubing 33 which in turn communicates with a pressure gauge 35; herein a mercury manometer gauge positioned remotely with respect to conduit 13 so as to be at a moderate temperature lower than the temperature of the hot vapor 11—usually the ambient temperature of the atmosphere surrounding gauge 35. It is to be understood that gauge 35 may be any pressure measuring means but preferably is a conventional gauge, for example, a Bourdon gauge, for measuring pressure at moderate temperatures.

Tubing 19 also communicates with tubing 41 which has a long portion 41a permitting remote gauging of the pressure of vapors 11 and a portion 41b coiled about pipe 13 and heated thereby. Coil 41b is tapped into pipe 13 at its open end 43 to provide direct communication between the interior of pipe 13 and the interior of tubing 41. Shut-off valve 45 is provided in coil 41b near end 43 and is adapted to be operated, herein, by a handle extending beyond insulation 15.

The term "direct communication" is intended to mean tubing 41 and pipe 13 are joined at open end 43 in a manner such that the purge gas 22 in conduit 41 and the vapors 11 from pipe 13 meet freely, i.e., no diaphragm, either metal or fluid, is interposed the two streams 11 and 22.

Coil 41b is of such length that should any aluminum trichloride vapor enter tubing 41b through end 43, the vapor will not be able to penetrate beyond the heated zone of coil 41b to condense and clog tubing 41 in the lower temperature portion 41a; pressure buildup of purge gas 22 within tubing 41 will retain the vapor within the heated zone of coil 41b, if this coil is of the proper length.

In this embodiment the gas delivery means 20 is represented by flowmeter 21, supply 23 and the connecting valve and tubing. Means 20 passes purge gas 22 into tubing 19 at a rate controlled to afford a substantially balanced flow state between purge gas 22 and vapor 11. Normally when the gaseous fluid in pipe 13 is a condensible vapor or is corrosive, it is preferred that there be a slight positive flow of purge gas 22 through tubing 41 into stream 11 to eliminate entirely from tubing 41b any of stream 11. However "substantial balance" is also intended to include pressure surge situations wherein temporarily stream 11 surges into coil 41b or there is a significant flow of purge gas 22 into pipe 13. Also even in a true balanced flow situation, a stationary body of vapor 11 may be present in coil 41b near end 43 meeting directly purge gas 22.

The method of the invention is applicable to measure the pressure of any gaseous fluid which is at a temperature too high for operation of ordinary pressure gauges or to gaseous fluids which are excessively corrosive to metals at ordinary temperatures or at higher temperatures to metals which are ordinarily corrosion resistant. Boron trifluoride and chlorine illustrate corrosive gases. The sulfur halides illustrate corrosive liquids whose pressures in the vapor state can be measured. The method is particularly applicable to normally solid materials which can be sublimed into the vapor state and which interfere with direct pressure measurement by the ease with which clogging solid deposits are laid down when operating close to the sublimation point; aluminum trichloride and aluminum tribromide are especially difficult to measure by ordinary methods.

In the method of the invention, the first gaseous stream (purge gas 22 in the figure) is placed in direct communication (open end 43 joining pipe 13) with another gaseous stream (hot vapor stream 11) whose pressure is to be measured; the two streams are placed in a substantially balanced flow condition and the pressure of the first gaseous stream (purge gas 22) is measured (by gauge 35) to determine the pressure of the other gaseous stream (hot vapor stream 11).

The first gas stream may be any gas which is inert with respect to, and does not influence the process using, the other gas. Preferably purge gas 22 is a relatively inert, non-condensible gas such as nitrogen, helium, argon, or hydrogen.

Gas delivery means 20 is controlled to afford, preferably, a slight flow of purge gas 22 into vapor stream 11. This flow is normally controlled so that the pressure in pipe 13 can be measured continuously with sufficient accuracy for operational control. However, when extreme accuracy of pressure measurement is desired, shut-off valve 27 is closed and gauge 35 is read with the system in a true static state. When it is necessary to have a continuous pressure reading, two purge gas supply cylinders will be provided, so that a continuous supply of gas will be available, i.e., the second cylinder will be used while the empty cylinder is being replaced.

When a condensible material, going either to the liquid or solid state, forms the gaseous fluid 11, some provision must be made to prevent clogging of tubing 41 when a pressure surge in pipe 13 causes fluid 11 to enter tubing 41 by way of open end 43. Condensation of vapor 11 is prevented by providing an increasing temperature differential, in the direction of vapor stream 11, for the first gaseous fluid zone (tubing 41).

In other words a portion of the purge gas conduit means (tubing 41) adjacent to its junction (open-end 43) with the body of gas (11) whose pressure is to be measured, is heated above the condensation temperature of gas (11). This heating zone may be provided by any means, such as, electrical heaters; the coil 41 as shown in the figure is a simple and preferred arrangement.

The apparatus and method of the inventions are illustrated by an operation wherein the vapor pressure of aluminum trichloride was measured. Here aluminum trichloride vapor was passing through a jacketed pipe at a pressure of about one atmosphere. The pipe was heated by circulating Dowtherm at 230° C. through a jacket; not shown in the figure for reasons of simplification.

One-quarter inch copper tubing was tapped into the vapor pipe and about 50 feet of tubing was wrapped around the jacket; the jacket and tubing were covered with thermal insulation. The tubing was run another 50 feet to a connection with other ¼ inch copper tubing which transmitted hydrogen purge gas to a mercury manometer. Also the tubing was connected to a hydrogen cylinder through a pressure regulator, a shut-off valve, a needle-control valve and a flowmeter. Here an ordinary bubble-type flowmeter, i.e., a transparent container of low vapor pressure oil was used.

Both the manometer and hydrogen cylinder were at room temperature. This valve was set to provide a slight flow of hydrogen gas into the vapor pipe—any aluminum trichloride forced into the coiled tubing by a pressure surge was quickly flushed out by the flow of hydrogen gas, after the pressure had stabilized. This arrangement permitted purge gas flow rates of 0–1 standard cubic foot per hour.

At a purge gas flow of 0.5 s.c.f.h. and a vapor pipe pressure of about 1 atmosphere, the above apparatus permitted measuring the vapor pressure within ±1 mm. of mercury.

Extremely high accuracy can be attained by using 0.5 inch tubing and stopping the purge gas flow while taking the reading.

An earlier arrangement which did not include the heated zone suffered from stoppage by aluminum trichloride solids. The coil heating zone eliminated these stoppages. If on a rare occasion a restriction should occur in the tubing, this restriction would immediately be indicated by a rapid rise in the manometer reading when gauges connected to other points of the overall operation did not show any pressure rise.

Thus having described the invention, what is claimed is:

1. An indirect method of measuring the pressure of vapor afforded by a normally solid material which method comprises:

placing a stream of a normally gaseous material at moderate temperature, in direct communication with said vapors, in a substantially balanced flow condition; and measuring the pressure exerted by said gaseous material to determine the vapor pressure of said solid.

2. The method of claim 1 wherein said solid is aluminum trichloride.

3. The method of claim 1 wherein said solid is aluminum tribromide.

References Cited by the Examiner
UNITED STATES PATENTS

| | | | |
|---|---|---|---|
| 1,100,867 | 6/1914 | Dexter | 73—302 |
| 2,041,859 | 5/1936 | Pyle et al. | 73—302 |
| 2,321,293 | 6/1943 | Hassler | 73—389 |

LOUIS R. PRINCE, *Primary Examiner.*

DAVID SCHONBERG, *Examiner.*

D. O. WOODIEL, *Assistant Examiner.*